United States Patent
Ferm et al.

(10) Patent No.: US 6,487,354 B1
(45) Date of Patent: Nov. 26, 2002

(54) DESIGN OF LOW INSERTION LOSS, SINGLE-MODE POLYMERIC WAVEGUIDES

(75) Inventors: Paul M. Ferm, Morristown, NJ (US); Kevin Battell, Emerson, NJ (US); Lawrence W. Shacklette, Maplewood, NJ (US)

(73) Assignee: Corning Incorporated, Corning, NY (US)

(*) Notice: Subject to any disclaimer, the term of this patent is extended or adjusted under 35 U.S.C. 154(b) by 3 days.

(21) Appl. No.: 09/846,699

(22) Filed: May 1, 2001

(51) Int. Cl.[7] .................................. G02B 6/10
(52) U.S. Cl. ........................ 385/129; 385/131
(58) Field of Search ................. 385/1–10, 14, 385/37, 129–132, 140–145; 264/1.1, 1.24, 1.25; 438/29, 31, 32; 65/386

(56) References Cited

U.S. PATENT DOCUMENTS

| 4,609,252 A | 9/1986 | Wong et al. ............ 350/96.12 |
| 4,901,321 A * | 2/1990 | Blondeau et al. ............ 372/45 |
| 5,861,976 A | 1/1999 | Hockstra ............ 359/288 |
| 5,903,697 A | 5/1999 | Yamada et al. ............ 385/129 |
| 6,114,090 A | 9/2000 | Wu et al. ............ 430/28.1 |
| 6,160,945 A * | 12/2000 | Rhee et al. ............ 385/129 |
| 6,229,949 B1 * | 5/2001 | Ido et al. ............ 385/132 |
| 6,396,988 B1 * | 5/2002 | Shimoda ............ 385/129 |

FOREIGN PATENT DOCUMENTS

JP        1-138509        5/1989

* cited by examiner

Primary Examiner—Hemang Sanghavi
Assistant Examiner—Scott Knauss
(74) Attorney, Agent, or Firm—Roberts & Mercanti, LLP

(57) ABSTRACT

The invention provides organic optical waveguide devices which are lithographically formed and employ polymeric materials having low propagation loss. An optical waveguide has a substrate; a polymeric buffer layer on a surface of the substrate; a thin, polymeric undercladding layer on a surface of the buffer layer; a pattern of a light-transmissive, polymeric core on the surface of the undercladding layer; and a polymeric overcladding layer on a top surface of the core and on sidewalls of the core and on a portion of the undercladding layer; the undercladding layer having a thickness of from about 10 percent to about 50 percent a thickness of the core. The core has an index of refraction $n_c$ which is greater than an index of refraction of the overcladding layer $n_o$ and also greater than an index of refraction of the undercladding layer $n_u$; wherein $\Delta n = n_c - n_o$, and wherein the difference between $n_c$ and the index of refraction of the buffer $n_b$ is at least about 1.5 times $\Delta n$.

24 Claims, 3 Drawing Sheets

DESIGN OF LOW INSERTION LOSS, SINGLE-MODE POLYMERIC WAVEGUIDES

BACKGROUND OF THE INVENTION

1. Field of the Invention

The present invention relates to optical waveguides, or more particularly to lithographically formed single-mode optical waveguides employing organic polymeric materials. The waveguide structure has a low propagation loss.

2. Technical Background

In optical communication systems, messages are transmitted by carrier waves at optical frequencies that are generated by such sources as lasers and light-emitting diodes. There is interest in such optical communication systems because they offer several advantages over conventional communication systems. They have a greatly increased number of channels of communication as well as the ability to transmit messages at much higher speeds than electronic systems using copper wires. This invention is concerned with the formation of light-transmissive optical waveguide devices. The operation of an optical waveguide is based on the fact that when a medium which is transparent to light is surrounded or otherwise bounded by another medium having a lower refractive index, light introduced along the inner medium's axis is highly reflected at the boundary with the surrounding medium, thus producing a guiding effect.

It is possible to produce polymeric optical waveguides and other optical interconnect devices which transport optical signals in optical circuitry or optical fiber networks. One method used to form an optical device involves the application of standard photolithographic processes. Photopolymers are of particular interest for optical interconnect applications because they can be patterned by photolithographic techniques which are well known in the art. Photopolymers also offer opportunity for simpler, more cost effective manufacturing processes. Lithographic processes are used to define a pattern in a light-sensitive, photopolymer containing layer deposited on a substrate. Among the many known photopolymers, acrylate materials have been widely used as waveguide materials because of their optical clarity, low birefringence and the ready availability of a wide range of monomers.

Planar polymer waveguides typically comprise layers of low loss optical materials of precise indices of refraction. Both step index and gradient index waveguide structures are known in the art. For planar polymer and glass waveguides, in particular, step index structures are most easily achieved through successive coating of materials with differing indices of refraction. Typically, the core has a refractive index which is 0.5% to 2% higher than the clad. The magnitude of this refractive index difference ($\Delta n$) is set to optimize the performance of the planar waveguides or to match light modes when the transition is made from the planar device to an optical fiber. In reality, most planar waveguide structures have a configuration where the underclad is applied first, followed by application and definition of the core layer, and followed finally by application of the overclad. Due to the height of the core, the overclad typically has a bump on it that can be quite large. This can occur in polymer waveguides in which polymers must be spin cast from a solvent solution due to their high molecular weight and viscosity. It can also occur in silica waveguides in which chemical vapor deposition of the overclad applies a uniform layer on top of the rib. In addition, reactive-ion etching of polymer or glass waveguide cores can result in high propagation losses due to scattering of light caused by rough sidewalls.

Waveguides can be made using photopolymerizable optical materials which can be coated and cured on a substrate. Typically, the materials include mixtures of monomeric and oligomeric components which are blended to provide the correct index of refraction. Mixtures are blended to provide a $\Delta n$ between core and clad, of typically 0.5 to 2 percent. In the photolithography of these curing mixtures, typically a guiding region having an index gradient instead of a step index can be formed in the underclad layer. Also, a region can form at the side and the top of the core in which an index gradient is found instead of a step index. The formation of the gradient index in the region surrounding the core is due to migration of dissimilar chemical components, particularly a monomer component moving from the core layer into the cladding layers. In the region directly under the core, the monomer component can further react during the formation of the core forming an unwanted guiding region within the undercladding layer. When the lower clad region is of about the same thickness as the core, a guiding layer can be formed that penetrates the full thickness of the clad. In extreme cases it can be as intensely guiding as the core itself and allows light to reach the substrate surface. Since the substrates of this invention may be absorbing at optical wavelengths of importance to telecommunications, any portion of the propagating light that reaches the substrate is subject to absorption. Absorption of light by the substrate leads to a severe undesirable polarization-dependent loss of optical power from the propagating signal.

Other attempts have been made in the art to resolve these issues. One potential solution is using a thick undercladding layer to isolate the core from the substrate to prevent this undesirable result. Eliminating the problem to the desired degree, however, requires the use of an impracticably thick undercladding. Another solution includes using a buffer region with an index which is 2% or more lower than the core, wherein the buffer region is below the underclad. Even if monomer diffusion occurs deeply through the underclad and slightly into the buffer, the guiding in the buffer will be greatly suppressed, eliminating most light absorption by the silicon. However, the underclad can still guide light and multimode waveguides with residual polarization effects can still result.

One method of lithographically forming optical elements uses an acrylic photoactive composition which is capable of forming a waveguide material upon polymerization. However, this utilizes polymers with as high a glass transition temperature as possible in order to provide for the greatest operating temperatures. Another method involves the production of waveguides using light polymerizable compositions such as acrylics having a Tg of at least 100° C. The foregoing waveguides suffer from undesirably high optical loss.

SUMMARY OF THE INVENTION

The invention provides a single-mode optical waveguide fabricated on a substrate wherein the substrate defines a surface. The single-mode optical waveguide comprises a polymeric buffer layer on the surface of the substrate, wherein the buffer layer defining a surface and having an index of refraction $n_b$. A thin, polymeric undercladding layer is on the surface of the buffer layer, wherein the undercladding layer defining a surface and having an index of refraction layer $n_u$. A pattern of a light-transmissive single-mode polymeric core is on the surface of the undercladding layer, wherein the core defines a top surface and sidewalls and wherein the core has an index of refraction $n_c$. A polymeric overcladding layer is on the top surface of the core and on the sidewalls of the core and on a portion of the undercladding layer and having an index of refraction $n_o$. The undercladding layer has a thickness of from about 10 percent to about 50 percent of a thickness of the core. The core index of refraction $n_c$ is greater than the index of refraction of the overcladding layer $n_o$ and also greater than the index of refraction of the undercladding layer $n_u$. In the waveguide, $\Delta n = n_c - n_o$, and the difference between $n_c$ and the index of refraction of the buffer $n_b$ is at least about 1.5 times $\Delta n$, and the value of $\Delta n$ is such that it produces a single-mode waveguide at optical communication wavelengths.

The invention also provides a method for forming a single-mode optical waveguide on a surface of a substrate. The method comprises the steps of depositing a polymeric buffer layer onto the surface of the substrate, wherein the buffer layer defines a surface and having an index of refraction $n_b$. One then deposits a polymeric undercladding layer onto the surface of the buffer layer, wherein the undercladding layer defines a surface and has an index of refraction $n_u$. One then deposits a pattern of a light-transmissive, polymeric core onto the surface of the undercladding layer such that the undercladding layer has a thickness of from about 10 percent to about 50 percent of a thickness of the core. The core has a top surface and a pair of sidewalls and an index of refraction $n_c$. One then deposits a polymeric overcladding layer onto the top surface core and onto the sidewalls of the core wherein the overcaldding has an index of refraction $n_o$. The core index of refraction $n_c$ is greater than the index of refraction of the overcladding layer $n_o$ and also greater than an index of refraction of the undercladding layer $n_u$; wherein $\Delta n = n_c - n_o$, and wherein the difference between $n_c$ and the index of refraction of buffer $n_b$ is at least about 1.5 times $\Delta n$, and wherein the value of $\Delta n$ produces a single-mode waveguide at optical communication wavelengths.

The invention further provides a method for forming a single-mode optical waveguide on a surface of a substrate. The method comprises the steps of depositing a polymeric buffer layer onto a surface of a substrate, wherein the buffer layer defining a surface and having an index of refraction $n_b$. One then deposits a polymeric undercladding layer onto the surface of the buffer layer, wherein the undercladding layer defining a surface and having an index of refraction $n_u$. One then deposits a photosensitive core layer onto the surface of the undercladding layer such that the undercladding layer has a thickness of from about 10 percent to about 50 percent of a thickness of the core, wherein the photosensitive core layer has an index of refraction $n_c$. One then imagewise exposes the photosensitive core layer to actinic radiation and developing the core layer, thereby removing non-image areas of the core layer and not removing image areas of the core layer thus forming a patterned light-transmissive core on the undercladding layer and partially revealing a portion of the undercladding layer, which core has a top surface and a pair of side walls. One then deposits a polymeric overcladding layer onto the top surface of the core, onto the pair of sidewalls of the core and onto the revealed portions of the undercladding layer. The core index of refraction $n_c$ is greater than the index of refraction of the overcladding layer $n_o$ and also greater than the index of refraction of the undercladding layer $n_u$; wherein $\Delta n = n_c - n_o$, and wherein the difference between $n_c$ and the index of refraction of buffer $n_b$ is at least about 1.5 times $\Delta n$, wherein the value of $\Delta n$ produces a single-mode waveguide at optical communication wavelengths.

It would be desirable to produce optical devices from polymeric materials which have low absorption and scattering loss at application wavelengths, and have precisely controllable refractive indexes for mode and numerical aperture control. Precise refractive index control allows control of mode and numeric aperture and permits fabrication of single-mode waveguides that match single-mode fibers in both cross sectional dimensions and numeric aperture. When the core and cladding materials are comprised of two or more miscible monomers, the index at each layer of a waveguide can be precisely tailored by mixing selected pairs of high index and low index monomers. This property can be used to precisely control the mode of a waveguide and can be used to fabricate large-size single-mode waveguides that match commercial single-mode fibers in both cross sectional dimensions and numeric aperture.

In this invention, a planar waveguide structure is formed in which a buffer, a reduced-thickness underclad, a core, and a normal-thickness overclad are applied to a substrate. Upon the buffer layer, a unusually thin underclad layer is applied and pre-cured. A core layer is applied on top of the reduced-thickness underclad. During the core application and cure, diffusion of low molecular weight, high index of refraction material takes place and increases the index of the underclad. A gradient index is formed through the underclad. The gradient index then sharply falls off with distance into the buffer region. However, the dimension of the reduced-thickness underclad and core are chosen such that optical multimode behavior is frustrated for all potential values of underclad index. In addition, an overcladding is applied, which coats both the sides and the top of the core. A similar diffusion of high index monomer occurs thereby assuring a gradient index around the core. The index profile is found to be now more balanced around the sides and bottom of the waveguide core. According to this invention, clear single-mode performance can be combined with exceptionally low coupling loss due to the improved mode matching with round single core fibers.

DETAILED DESCRIPTION OF THE INVENTION

The invention provides a single-mode optical waveguide and processes for forming optical waveguides. The waveguide of the invention comprises a substrate; a polymeric buffer layer on a surface of the substrate; a thin, polymeric undercladding layer on a surface of the buffer layer; a pattern of a light-transmissive single-mode polymeric core on the surface of the undercladding layer; and a polymeric overcladding layer on a top surface of the core and on sidewalls of the core and on a portion of the undercladding layer. An important feature of the invention is that the undercladding layer has a thickness of from about 10 percent to about 50 percent of a thickness of the core. Another important feature of the invention is that the core has an index of refraction $n_c$ which is greater than an index of refraction of the overcladding layer $n_o$ and also greater than an index of refraction of the undercladding layer $n_u$; wherein $\Delta n = n_c - n_o$, and wherein the difference between $n_c$ and the index of refraction of the buffer $n_b$ is at least about 1.5 times $\Delta n$.

Figure 1:
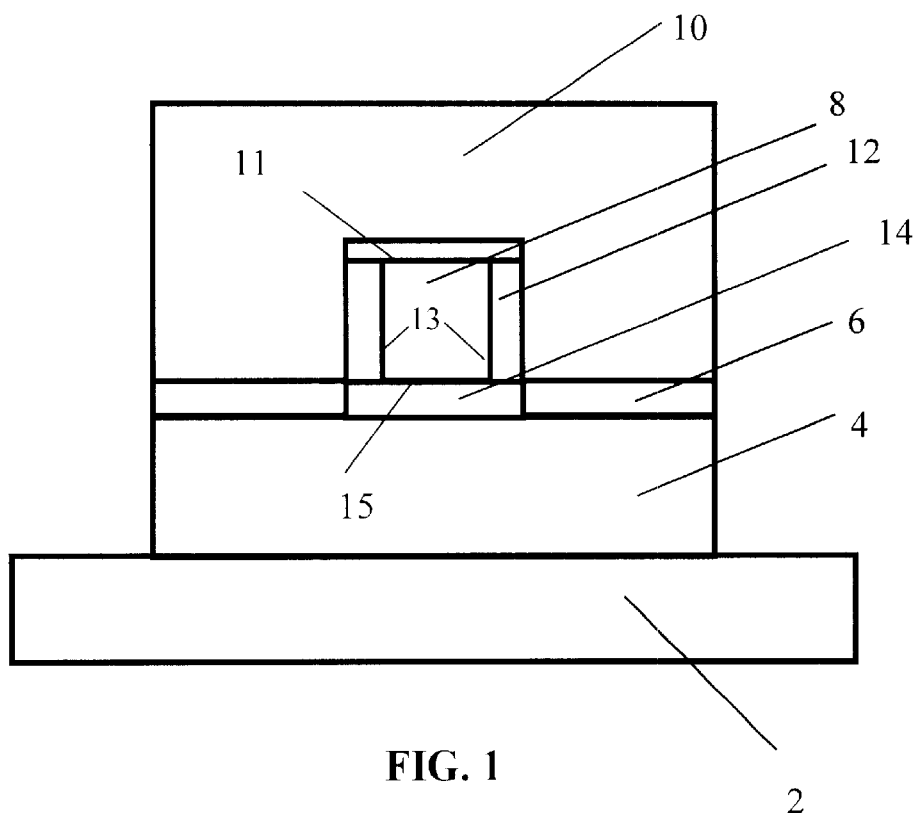
FIG. 1 is a schematic representation of a polymeric waveguide having a side interface region between the sidewalls of the core and the overcladding, a top interface region between the top of the core and the overcladding, and a floor interface region between a floor of the core and the undercladding layer.

Referring to FIG. 1, there is shown a schematic representation of a waveguide according to the invention. A polymeric buffer layer 4 is initially deposited onto a surface of a substrate 2. The substrate 2 may be any material on which it is desired to establish a waveguide including materials such as silicon, silicon oxide, gallium arsenide, silicon nitride, glass, quartz, plastics, ceramics, crystalline materials and the like. The substrate 2 may or may not contain other devices, for example, topographical features such as grooves or electrical circuits or electro-optic devices such as laser diodes.

Since the substrates 2 of this invention are absorbing at optical wavelengths of importance to telecommunications, any portion of the propagating light that reaches the substrate 2 is subject to absorption. Absorption of light by the substrate 2 leads to an undesirable polarization-dependent loss of optical power from the propagating signal. The purpose of an intermediate buffer layer 4 is to restrict the penetration of the light into the substrate 2 and to prevent any significant amount of the light from reaching the substrate 2. In order for the buffer 4 to function as desired, it is necessary for its index of refraction to be significantly below that of the core 8 and the cladding layers. The polymeric buffer layer 4 may be applied in a number of different ways known in the art, such as spin coating, dip coating, slot coating, roller coating, doctor blading, liquid casting or the like. The buffer layer 4 may comprise photopolymerizable compounds, such as acrylate compounds. Acrylate compounds are described below. Once the layer of photopolymerizable material is deposited onto the surface of the substrate 2, it is at least partially polymerized by an overall exposure to actinic radiation. The buffer layer 4 may have a thickness of from about 3 microns to about 500 microns, usually from about 5 microns to about 50 microns. Suitably the buffer layer has a thickness of from about 7 microns to about 30 microns.

In order to promote adhesion between subsequently applied polymer layers and in some case to control the gradation of index of refraction at the interface, the initially applied layers, including the buffer layer 4, may be purposefully left substantially under cured in order to promote the interpenetration of monomers and the formation of covalent bonds between layers. After the buffer layer 4 is deposited onto the substrate 2, a thin, polymeric undercladding layer 6 is deposited onto a surface of the buffer layer 4. The undercladding layer 6 may also be applied via the above mentioned techniques. The undercladding layer also may comprise photopolymerizable acrylate compounds which are described below. After the photopolymerizable undercladding layer is deposited, it is then polymerized by an overall exposure to actinic radiation.

As an important aspect of this invention, the undercladding layer 6 is limited to an unusually thin thickness. The undercladding layer has a thickness of from about 10 percent to about 50 percent of a thickness of the core. Usually the undercladding layer has a thickness of from about 10 to about 50% of the core thickness. More suitably the undercladding layer has a thickness of from about 20 to about 40% of the core thickness, most desirably from about 30 to about 37% of the core thickness. It is also desired that the thickness of the buffer 4 plus undercladding 6 is less than about 50 microns. More desirably the thickness of the buffer 4 plus undercladding 6 is less than about 30 microns, and usually it is less than 20 microns. This reduced thickness undercladding 6 is important in achieving the goals of this invention. When this reduced thickness undercladding layer 6 is coupled with the buffer 4, core region 8 and an overclad layer 10, optical multimode behavior is frustrated for all potential values of the underclad refractive index.

After the undercladding layer 6 is deposited and polymerized, a core 8 is formed on the surface of the undercladding layer 6. In one embodiment, the core 8 is formed by depositing a light-transmissive, photosensitive core layer onto the surface of the undercladding layer. A layer of the core composition 8 is deposited using well known techniques such as spin coating, dip coating, slot coating, roller coating, doctor blading, liquid casting or the like. The photosensitive core layer 8 is then imagewise exposed to actinic radiation and developed, thereby removing non-image areas of the core layer and not removing image areas of the core layer. This process is described in more detail below. After the core layer is developed, a patterned, light-transmissive core 8 is formed on the undercladding layer 6 and a portion of the undercladding layer is partially revealed. The structure of the core 8 at this stage of fabrication is commonly described as a standing rib.

In another embodiment of the invention, the core layer 8 is formed by depositing a pattern of a light-transmissive, polymeric core layer onto the surface of the undercladding layer 6. The core pattern may be produced using well known lithographic techniques or other techniques such as reactive-ion-etching. In either embodiment, the core has a cross-sectional width about equal to its cross-sectional height and the cross-sectional width and cross-sectional height are both selected from the group consisting of about 2 $\mu$m, about 4 $\mu$m, about 5 $\mu$m, about 6 $\mu$m, about 7 $\mu$m, about 8 $\mu$m, about 9 $\mu$m, and about 10 $\mu$m. The core layer 8 may have a cross-sectional width and cross-sectional height each of which range from about 2 $\mu$m to about 10 $\mu$m, more usually the core 8 has a cross-sectional width and height which each range from about 5.5 $\mu$m to about 8 $\mu$m. It is also usual that the width of the core 8 is no more than about twice the height of the core 8, and the height is no more than about twice the width. Further, an embodiment of the invention the core is single-mode in each of its width and height. In order to minimize coupling losses to standard single-mode glass fiber, for example to SMF-28 sold by Corning Incorporated, a core cross-sectional dimension of from about 6×6 microns to about 8×8 microns is useful. Materials for the core layer include polymerizable acrylate materials which are described in detail below.

After the core 8 is formed, an overcladding layer 10 is deposited onto a top surface 11 of the core 8, onto side walls 13 of the core 8 and onto the revealed portions of the undercladding layer 6. The photopolymerizable overcladding layer 10 is also applied via the above mentioned techniques and then overall exposed to actinic radiation. Usually the overcladding layer has a thickness measured from the top of the core of from about 3 to about 30 microns, more suitably from about 5 to about 20 microns, and most usually from about 8 to about 15 microns. The overcladding layer can be any material capable of keeping applied light in the core 8 and may comprise polymerizable acrylate compounds which are described in detail below.

The waveguides are formed using photopolymerizable optical materials that include mixtures of monomeric and oligomeric components which are blended to provide a desired index of refraction for each layer. The particular index of refraction for each layer has a significant effect on the performance of the waveguide. In an embodiment of the invention, when selecting the photopolymerizable compounds to be used in each of the core 8, undercladding 6 and overcladding layers 10, it is important that the core 8 has an index of refraction $n_c$ which is greater than an index of refraction $n_o$ of the overcladding layer 10 and also greater than an index of refraction $n_u$ of the undercladding layer 6 wherein $\Delta n = n_c - n_o$, and wherein the difference between $n_c$ and the index of refraction of the buffer $n_b$ is at least about 1.5 times $\Delta n$. More usually, the difference between $n_c$ and $n_b$ is at least about 2 times $\Delta n$. Desirably, the difference between $n_c$ and $n_b$ is at least about 3 times $\Delta n$. In an embodiment of the invention, the $\Delta n$ ranges from about 0.0031 to about 0.079.

In the usual applications of the invention, the waveguiding structures produced are single-mode. Ensuring that a waveguide will be single-mode entails maintaining a certain relationship between the physical cross-sectional size and shape of the waveguide and the value of $\Delta n$. Generally if the dimension of the waveguide is held fixed, then there is a maximum (cutoff) value of $\Delta n$ that can not be exceeded if the waveguide is to be single-mode. Similarly, if the value of $\Delta n$ is held fixed, then there is a maximum cross-sectional dimension for the waveguide that cannot be exceeded, if the waveguide is to be single-mode. As an illustration, Table 1 presents the relationship between size and the maximum permitted value of $\Delta n$ for the common case of a waveguide possessing a square cross-section. Lastly, in order to maximize the coupling efficiency of the waveguide and to minimize light propagation losses in bends, it is generally desirable to employ a value of $\Delta n$ that is approximately equal to but not in excess of the cutoff value.

TABLE 1

| Waveguide Core Dimension ($\mu$m) | Cutoff value of $\Delta n$ for wavelength = 1.55 microns |
|---|---|
| 2 × 2 | 0.079 |
| 4 × 4 | 0.019 |
| 6 × 6 | 0.0086 |
| 7 × 7 | 0.0064 |
| 8 × 8 | 0.0049 |
| 10 × 10 | 0.0031 |

Generally the refractive index $n_c$ of the core is in the range of from about 1.33 to about 1.7, or more suitably from about 1.4 to about 1.55. Usually the undercladding has a refractive index $n_u$ in the range of from about 1.3 to about 1.65, or more suitably from about 1.35 to about 1.55. Usually the overcladding has a refractive index $n_o$ in the range of from about 1.3 to about 1.65, or more suitably from about 1.35 to about 1.55. It is also important to select to select compounds that produce a buffer layer having a refractive index $n_b$ less than those of the core material and each of the cladding layers. Usually the buffer has a refractive index in the range of from about 1.3 to about 1.55, or more suitably from about 1.3 to about 1.4.

In the photolithography of these mixtures, it is common for the monomeric component of the core to migrate into the undercladding layer, forming a floor interface region 14 between a floor 15 of the core and the undercladding layer 6, the floor interface region 14 having an index of refraction $n_f$, and a side interface region 12 between the sidewalls 13 of the core 8 and the overcladding layer 10, the side interface region 12 having an index of refraction $n_s$. These interface regions 12 and 14 can be seen in FIG. 1. These interface regions have a gradient index rather than a step index. The interface regions are formed because the monomers of the core can diffuse out into the clad material and become fixed in the clad as a result of subsequent exposure to actinic radiation as the core and then the overclad are cured. The extent of interdiffusion of core and clad monomers depends on the degree of cure of clad and core, on the temperature and diffusivity of the monomers employed, and the time of contact between uncured or partially cured layers before the full waveguide structure is hard cured in a final step. Interdiffusion of monomers is greatest at the bottom and sides of the core because these regions are typically less cured during the intermediate fabrication steps. This low degree of cure is caused in the case of the core-underclad interface by a desire to promote bonding between core 8 and the underclad 6, and in the case of the sides of the core by a reduction in cure dose at the edges caused by diffraction effects in mask-based lithography or by beam profile intensity variation for laser direct-write fabrication techniques. When the undercladding region 6 is of about the same thickness as the core 8, the floor interface region 14 can in some instances even penetrate the full thickness of the underclad 6. In extreme cases the interface region can be of sufficient size and index of refraction to become as intensely guiding as the core itself and thus allow light to reach the silicon substrate surface where the light is absorbed, causing severe polarization-dependent loss effects.

Figure 2:
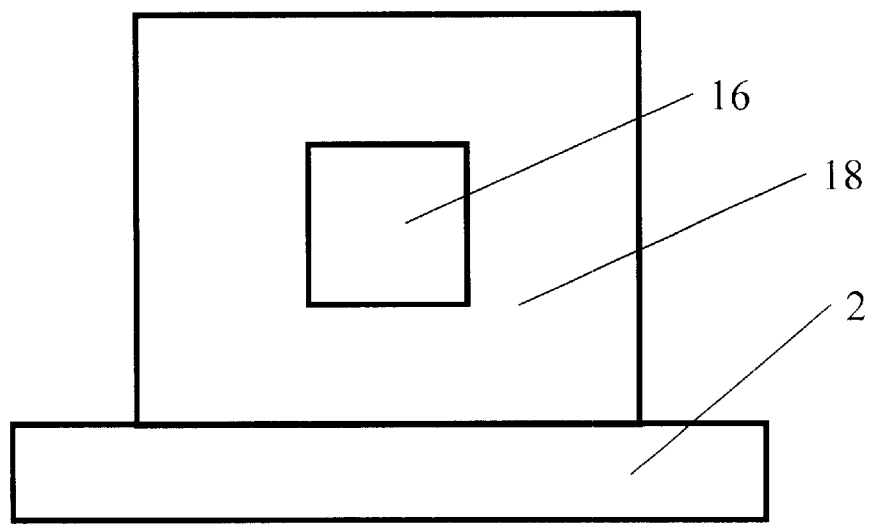
FIG. 2 is a schematic representation of waveguide having an ideal step index structure.
Figure 3:
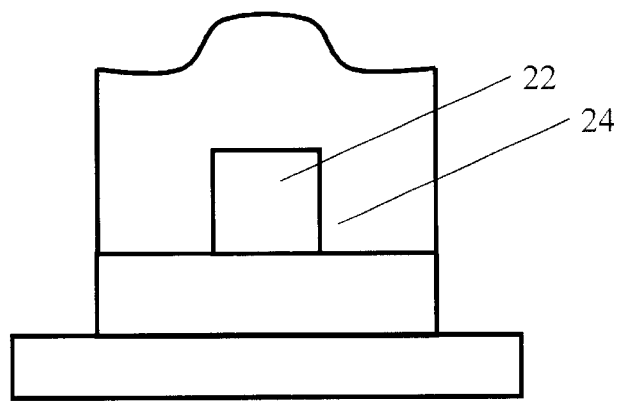
FIG. 3 is a schematic representation of prior art waveguide having a normal step index structure.
Figure 4A:
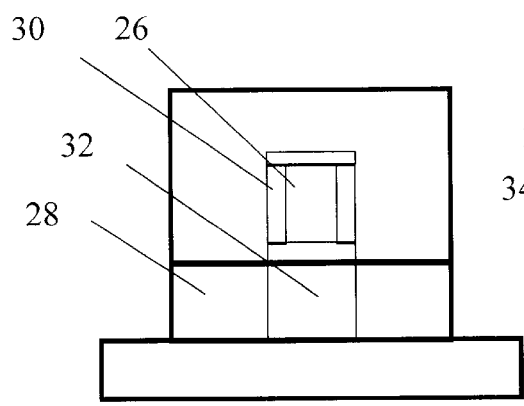
FIG. 4(a) is a schematic representation of a prior art waveguide fabricated from photopolymer having an underclad, and a gradient index region around the core including a guiding region in the underclad.
Figure 4B:
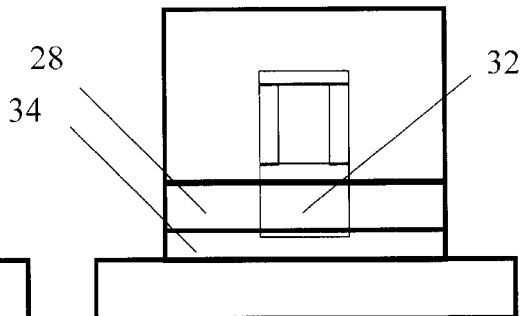
FIG. 4(b) is a schematic representation of a prior art waveguide having an underclad, a guiding region in the underclad, a gradient index at the sides and top of the core, and a low index buffer beneath the underclad.

As seen in FIG. 2, an ideal waveguide having ideal performance is shown. Ideally, light would be transmitted through a core 16 having no diffusion of core components into cladding 18 and zero light absorbed into substrate 2. However, in reality, conventional prior art waveguides look more like the one shown in FIG. 3, where the overclad 24 has a bump due to the height of the core 22. This bump is undesirable and disadvantageous. FIGS. 4(a)–4(b) also show disadvantageous waveguides of the prior art. FIG. 4(a) shows a waveguide having a high refraction index guiding region 32 being formed in the underclad 28. Guiding region 32 extends through the underclad and to the substrate where a significant amount of light may leak and be absorbed. FIG. 4(b) shows a waveguide having a low index buffer layer 34 below the underclad 28 in an effort to prevent guiding region 32 from reaching the substrate. Because guiding light still leaks into the region 32 below the core, waveguides of this type may have high coupling loss due to a poor match between the shape of the mode for the waveguide and the shape of the mode for conventional fiber. The present invention reduces the problems of the prior art, limiting the loss caused by these guiding regions by having an unusually thin undercladding layer and a buffer layer with refractive indexes as described herein. In one embodiment of the invention, the side interface refractive index $n_s$ is about equal to the floor interface refractive index $n_f$. In an embodiment of the invention, $n_s$ is a graduated index of refraction which decreases from about $n_c$ at the portion of the side interface region closest to the sidewalls of the core to about $n_o$ at the portion of the side interface region closest to the overcladding. Also in an embodiment of the invention, $n_f$ is a graduated index of refraction which decreases from about $n_c$ at the portion of the floor interface region closest to the floor of the core to about $n_u$ at the portion of the floor interface region closest to the undercladding layer. It is also desired that the graduated index of refraction $n_s$ is about the same, i.e. about matches the graduated index of refraction $n_f$. This means the change in index per unit length of medium traversed and the same starting and stopping values.

The compositions used to form each of the buffer 4, cladding layers 6 and 10 and core 8 comprise a photopolymerizable compound and a photoinitiator. The photopolymerizable compound may be a monomer, oligomer or polymer which is an addition polymerizable, nongaseous (boiling temperature above 30° C. at normal atmospheric pressure), ethylenically unsaturated compound containing at least one terminal ethylenically unsaturated group, and is capable of forming a high molecular weight polymer by free radical initiated, chain propagating addition polymerization. Such compounds are well known in the art. They are selected such that the formed polymerized element has the desired refractive index as described above. The determination of the refractive index for the particularly selected polymerized compositions are easily determinable by those skilled in the art.

Multifunctional acrylate monomers are suitable. The generalized structure of the multifunctional acrylates is given below:

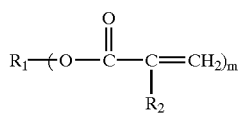

For the core, m may range from 1 to about 6; $R_2$ is H or $CH_3$, and $R_1$ is a linkage of aliphatic, aromatic or aliphatic and aromatic mixed organic molecular segments. $R_1$ may be an alkylene, alkylene oxide, arylene oxide, aliphatic polyether or polyester moiety and $R_2$ is preferably H. To ensure solvent resistance of the film and high contrast photolithography, crosslinked polymers and therefore multifunctional acrylate monomers ($m \geq 2$) are suitable. It is also desirable to reduce stress induced scattering optical loss of the final waveguiding device by using flexible, low glass transition temperature (Tg) polymers. It is known in the art that glass transition temperature (Tg) of a crosslinked polymer depends on the crosslinking density and the structure of the linkage between crosslinking points. It is also known that both low crosslinking density and flexible linkage require a low Tg. To ensure low crosslinking density, monomers with $1 \leq m \leq 3$, usually m=2, and long linkage segments between two ethylenically unsaturated functionalities are suitable. For this invention, long linkage segments are those which have an average molecular chain length of at least about 4 carbon atoms or larger and desirably 6 or larger. Suitable flexible linkage structures include alkylenes with chain length larger than about 3 carbon atoms, poly(ethylene oxide), poly(propylene oxide), ethoxylated bisphenol A, polyethers, thioethers, aliphatic and aromatic hydrocarbons, ethers, esters and polysiloxanes, etc. These may optionally be substituted with any pendant group which does not detract from the ability of the polymerizable compound to photopolymerize or add undue loss at the light wavelengths of interest, e.g., wavelengths of 1.31 and 1.55 microns for telecommunications. Suitable substituents nonexclusively include alkyl, aryl, alkoxy and sulfoxide groups, etc. To ensure high resistance to thermal degradation and discoloration, thermally stable molecular structures of $R_1$ are desired. Such $R_1$ segments should be free of thermally susceptible moieties such as aromatic urethane and amide groups. To ensure low birefringence, $R_1$ linkages with low stress optic coefficient and optical polarizability are desired.

For the cladding layers, the acrylate is also as described above, however, the average molecular chain length between ethylenically unsaturated functionalities is desirably about 6 carbon atoms or longer, usually 8 or longer and more usually 12 or longer. Suitable flexible linkage structures include alkylenes with chain length larger than 6 carbon atoms, poly(ethylene oxide), poly(propylene oxide) and ethoxylated bisphenol A.

In an embodiment of the invention, materials for each the buffer 4, undercladding layer 6, core layer 8 and overcladding layer 10 also include polymerizable esters and partial esters of acrylic acid and of aromatic and aliphatic polyols containing 2 to 30 carbon atoms. The partial esters and esters of polyoxyalkylene glycols are also suitable. Examples are ethylene glycol diacrylate, diethylene glycol diacrylate, triethylene glycol diacrylate, tetraethylene glycol diacrylate, polyethylene glycol diacrylates and polypropylene glycol diacrylates having an average molecular weight in the range from 200 to 2000, propylene glycol diacrylate, dipropylene glycol diacrylate, ($C_2$ to $C_{40}$)alkane diol diacrylates such as hexanediol diacrylate, and butanediol diacrylate, tripropylene glycol diacrylate, trimethylolpropane triacrylates, ethoxylated trimethylolpropane triacrylates having an average molecular weight in the range from 500 to 1500, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, oligoester acrylates, glycerol di- and triacrylate, 1,4-cyclohexane diacrylate, bisacrylates of polyethylene glycols having an average molecular weight from 100 to 1500, and mixtures of the above compounds. Multifunctional acrylate oligomers include, but are not limited to acrylated epoxies, acrylated polyurethanes and acrylated polyesters. Photopolymerizable compounds may be aryl acrylates. Illustrative of such aryl acrylate monomers are aryl diacrylates, triacrylates and tetraacrylates as for example di, tri and tetraacrylates based on benzene, naphthalene, bisphenol A, biphenylene, methane biphenylene, trifluoromethane biphenylene, phenoxyphenylene and the like. The aryl acrylate monomers may be multifunctional aryl acrylates and more usually the aryl acrylate monomers are di, tri and tetra acrylates based on the bisphenol-A structure. The aryl acrylate monomers may be alkoxylated bisphenol-A diacrylates such as ethoxylated bisphenol-A di-acrylate, propoxylated bisphenol A diacrylates and ethoxylated hexafluorobisphenol-A diacrylates. The aryl acrylate monomers of choice are ethoxylated bisphenol-A diacrylates. Polymerizable components may be monomers having the structure (I):

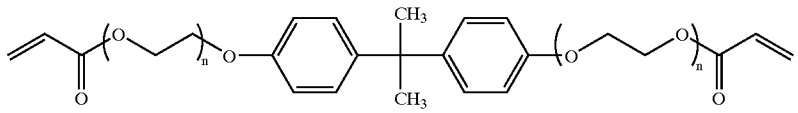

In one embodiment, for the core, n is about 10 or less, usually about 4 or less and suitably about 2 or less. In one embodiment, for the cladding layers, n is about 2 or more, usually about 4 or more and suitably about 10 or more. Also useful are acrylate containing copolymers which are well known in the art. In an embodiment, each cladding layer comprises a polymerizable component which has the ethoxylated bisphenol-A diacrylate structure (I) shown above wherein $1 \leq n \leq 20$, usually $4 \leq n \leq 15$, and suitably $8 \leq n \leq 12$.

The polymerizable compositions may be multifunctional fluorinated (meth)acrylates, particularly those based on the following structures:

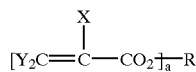

Where Y is H or D; X is H, D, F, Cl or $CH_3$, and a is an integer from 2 to 4

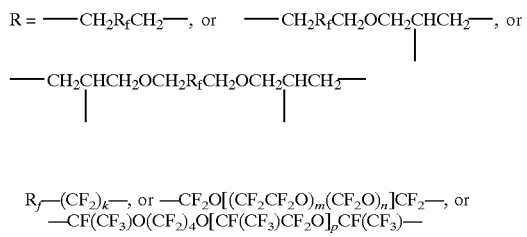

Where k, m, n, and p are integers

These materials have produced waveguides with propagation losses of as little as 0.17 dB/cm at 1550 nanometers. The glass transition temperatures (Tg) of these materials can be easily selected to be below the operating temperature of thermo-optic devices. Low Tg versions of these materials have been shown to have negligible birefringence by grating assisted measurements, and to possess a high value of the temperature derivative of refractive index, which allows the fabrication of power efficient thermo-optic devices such as optical switches and tunable gratings.

Useful fluorinated (meth)acrylates include, for example a tetraacrylate F60TA was made from the polyol, Fluorolink® T, which is commercially available from Ausimont which is shown below:

Other multifunctional acrylates include C6DIACRY from Akzo Chemicals B.V. of Amersfoort Netherlands:

L-12043 from the 3M Company of Saint Paul, Minn.:

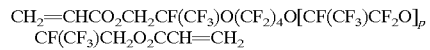

L-9367 from the 3M Company of Saint Paul, Minn.:

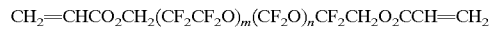

Although each of the buffer, undercladding, overcladding and core may be comprised of structurally similar compositions, in order for each of the buffer, undercladding and overcladding to have a refractive index which is lower than the refractive index of the core, they must have different chemical compositions for any individual application. For example, the buffer layer composition may have a similar Tg property as each of the cladding layers, but need not be the identical composition. The photopolymerizable materials and processing conditions are selected such that the Tg of the polymerized buffer ranges from about 60° C. or less, usually about 40° C. or less and suitably about 25° C. or less.

It is a feature of the present invention that the photopolymerizable compounds to be used in the waveguide core produce a core which after polymerization has a glass transition temperature of about 80° C. or less and usually about 50° C. or less. It is a feature of the present invention that the photopolymerizable compounds to be used in the waveguide cladding layers produce cladding layers which after polymerization have a glass transition temperature of about 60° C. or less, suitably about 40° C. or less and more usually about 25° C. or less. The particular Tg may be easily obtained by the skilled artisan by characterization and selection of the polymerizable component. This depends on such factors as the molecular weight, number of sites of unsaturation and crosslink density of the polymerizable component. A single polymerized component may itself have the requisite Tg, or the polymerizable component may be tailored by blending mixtures of polymerizable monomer, oligomers and/or polymers having the desired Tg. The Tg may also be controlled by varying the exposure time and temperatures at which polymerization is conducted.

The photopolymerizable compound is present in each overall photopolymerizable composition in an amount suf-

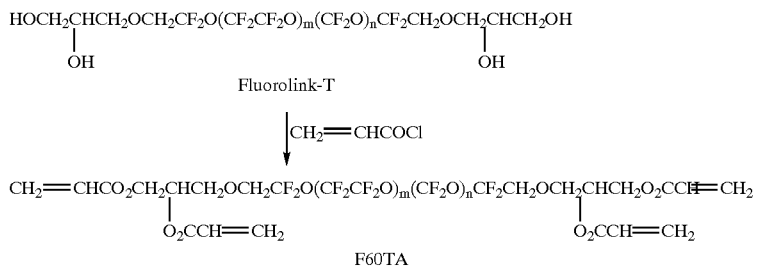

ficient to photopolymerize upon exposure to sufficient actinic radiation. The amount of the photopolymerizable compound in the composition may vary widely and amounts normally used in photopolymerizable compositions for use in the preparation of photopolymers for use as the light-transmissive element of light-transmissive devices may be used. The amount of photopolymerizable compound is generally used in an amount of from about 35 to about 99.9% by weight of the composition. The photopolymerizable compound may be present in the overall composition in an amount of from about 80% to about 99.5% by weight, and suitably from about 95 to about 99% based on the weight of the overall composition.

Each light-sensitive composition further comprises at least one free radical generating photoinitiator which photolytically generates free radicals. Usually the photoinitiator is a free-radical generating addition polymerization initiator activated by actinic light and may be thermally inactive near room temperature (e.g. from about 20° C. to about 80° C.) Any photoinitiator which is known to photopolymerize acrylates can be used. Photoinitiators nonexclusively include quinoxaline compounds; the vicinal polyketaldonyl compounds; the alpha-carbonyls; the acyloin ethers; the triarylimidazolyl dimers; the alpha-hydrocarbon substituted aromatic acyloins; polynuclear quinones and s-triazines.

Suitable photoinitiators include aromatic ketones such as benzophenone, acrylated benzophenone, 2-ethylanthraquinone, phenanthraquinone, 2-tert-butylanthraquinone, 1,2-benzanthraquinone, 2,3-benzanthraquinone, 2,3-dichloronaphthoquinone, benzyl dimethyl ketal and other aromatic ketones, e.g. benzoin, benzoin ethers such as benzoin methyl ether, benzoin ethyl ether, benzoin isobutyl ether and benzoin phenyl ether, methyl benzoin, ethyl benzoin and other benzoins. Usual photoinitiators are 1-hydroxycyclohexylphenyl ketone (Irgacure® 184), benzoin, benzoin ethyl ether, benzoin isopropyl ether, benzophenone, benzodimethyl ketal (Irgacure® 651), 2,2-diethyloxy acetophenone, 2-hydroxy-2-methyl-1-phenylpropan-1-one (Darocur® 1173), 1-[4-(2-hydroxyethoxy)phenyl]-2-hydroxy-2-methylpropan-1-one (Darocur® 2959), 2-methyl-1-[(4-methylthio)phenyl]-2-morpholinopropan-1-one (Irgacure® 907), 2-benzyl-2-dimethylamino-1-(4-morpholinophenyl)-butan-1-one (Irgacure® 369), poly{1-[4-(1-methylvinyl)phenyl]-2-hydroxy-2-methyl-propan-1-one} (Esacure KIP), [4-(4-methylphenylthio)-phenyl]phenylmethanone (Quantacure® BMS) from Great Lake Fine Chemicals Limited Of London, England, and di-campherquinone. The most desired photoinitiators are those which tend not to yellow upon irradiation. Such photoinitiators include benzodimethyl ketal (Irgacure® 651), 2-hydroxy-2-methyl-1-phenylpropan-1-one (Darocur® 1173) available from E. Merck of Darmstadt, Germany, 1-hydroxy-cyclohexyl-phenyl ketone (Irgacure 184), and 1-[4-(2-hydroxyethoxy)phenyl]-2-hydroxy-2-methyl-propan-1-one (Darocur 2959). Fluorolink® T and C6DIACRYL are sufficiently miscible that conventional photoinitiators can be used for UV curing. For the more highly fluorinated multifunctional acrylates, such as materials L-12043 and L-9367 from 3M, a fluorinated photoinitiator may be used.

The free radical generating photoinitiator is present in each photopolymerizable composition in an amount sufficient to effect photopolymerization of the photopolymerizable compound upon exposure to sufficient actinic radiation. The photoinitiator is generally present in an amount of from about 0.01% to about 10% by weight of the overall composition, or more usually from about 0.1% to about 6% and suitably from about 0.5% to about 4% by weight based on the total weight of the composition.

Other additives may also be added to the photosensitive compositions depending on the purpose and the end use of the light-sensitive compositions. Examples of these include solvents, antioxidants, photostabilizers, volume expanders, fillers such as for example silica, titania, glass spheres and the like (especially when in the nanoscale regime, particle size less than about 100 nm), dyes, free radical scavengers, contrast enhancers, nitrones and UV absorbers. Antioxidants include such compounds as phenols and particularly hindered phenols including Irganox 1010 from Ciba-Geigy of Tarrytown N.Y.; sulfides; organoboron compounds; organophosphorous compounds; N,N'-hexamethylenebis(3,5-di-tert-butyl-4-hydroxyhydrocinnamamide) available from Ciba-Geigy under the tradename "Irganox 1098". Photostabilizers and more particularly hindered amine light stabilizers include but are not limited to poly[(6-morpholino-s-triazine-2,4-diyl)[(2,2,6,6,-tetramethyl-4-piperidyl)imino]-hexamethylene [(2,2,6,6,-tetramethyl-4-piperidyl)imino] available from Cytec Industries of Wilmington, Del. under the tradename Cyasorb UV-3346. Volume expanding compounds include such materials as the spiral monomers known as Bailey's monomer. Examples of dyes include methylene green, methylene blue, and the like. Suitable free radical scavengers include oxygen, hindered amine light stabilizers, hindered phenols, 2,2,6,6-tetramethyl-1-piperidinyloxy free radical (TEMPO), and the like. Suitable contrast enhancers include other free radical scavengers such as nitrones. UV absorbers include benzotriazole, hydroxybenzophenone, and the like. These additives may be included in quantities, based upon the total weight of the composition, from about 0% to about 6%, and usually from about 0.1% to about 1%. Usually all components of the overall composition are in admixture with one another, and most desirably in a substantially uniform admixture.

Once the first photosensitive composition is formed onto the substrate 2 in a thin or thick film, actinic radiation is directed onto the film in order to delineate the core layer. That is, the position and dimensions of the core 8 is determined by the pattern of the actinic radiation upon the surface of the core layer. The radiation pattern must be chosen so that the photopolymerizable composition is polymerized in the desired pattern and so that other regions of the film remain unreacted. The photopolymer of the invention is conventionally prepared by exposing the polymerizable composition to actinic radiation of the required wavelength and intensity for the required duration. As used herein "actinic radiation" is defined as light in the visible, ultraviolet or infrared regions of the spectrum, as well as electron beam, ion or neutron beam or X-ray radiation. Actinic radiation may be in the form of incoherent light or coherent light, for example, light from a laser. Sources of actinic light, and exposure procedures, times, wavelengths and intensities may vary widely depending on the desired degree of polymerization, the index of refraction of the photopolymer and other factors known to those of ordinary skill in the art. Such conventional photopolymerization processes and their operational parameters are well known in the art.

Sources of actinic radiation and the wavelength of the radiation may vary widely, and any conventional wavelengths and sources can be used. It is usual that the photochemical excitation be carried out with relatively short wavelength (or high energy) radiation so that exposure to radiation normally encountered before processing (e.g., room lights) will not prematurely polymerize the polymerizable material. Thus, exposure to ultraviolet light (300–400 nm wavelength) is convenient. Also, exposure by deep ultraviolet light (190–300 nm wavelength) is useful. Convenient sources are high pressure mercury-xenon arc lamps fitted with appropriate optical filters to select the desired wavelengths for processing. Also, short wavelength coherent radiation is useful for the practice of this invention. An argon ion laser operating in the UV mode at several wavelengths near 350 nm is desirable. Also, a frequency-doubled Argon ion laser with output near 257 nm wavelength is highly desirable. Alternatively, the processing can utilize a multiphoton process initiated by a high intensity source of actinic radiation such as a laser. It is also possible to cure the above fluorinated monomers without photoinitiators through the use of electron beam curing. Electron beam or ion beam excitation may be utilized. Exposure time normally varies from a few seconds to about 10 minutes. Temperatures usually range from about 10° C. to about 60° C., however, room temperature is desirable. Additionally, these materials could be cured thermally through the use of peroxides or other thermal initiators.

Control of the spatial profile of the actinic radiation, that is, where it falls on the layer of photopolymerizable material may be achieved by conventional methods. For example, in one conventional method, a mask bearing the desired core pattern is placed between the source of actinic radiation and the photopolymerizable composition film. The mask has transparent and opaque regions which allow the radiation to fall only on the desired regions of the film surface. Masked exposure of thin films is well known in the art and may include contact, proximity and projection techniques for printing the core pattern onto the film. Another conventional method of spatial control is to use a source of actinic radiation which comprises a directed or focused beam such as a laser or electron beam. Such a beam intersects only a small area of the photo-polymerizable material film surface. The pattern of the desired core is achieved by moving this small intersection point around on the film surface either by scanning the beam in space or by moving the substrate so that the intersection point is changed relative to a stationary beam. These types of exposure using a beam source are known in the art as direct-write methods. The precise cross-sectional shape of the waveguide core and the width and degree of the graded index region formed at the sides of the core is influenced by the degree of collimation of the light source for both direct-write and mask exposure methods of fabrication. Depending on the desired result the degree of collimation may vary widely. It is generally desired, however, to use a relatively highly collimated source for the definition of the waveguide core structure. Collimation to within and angle of less than 10 degrees is desired.

After the photopolymerizable composition of the core layer has been polymerized to form the predetermined pattern of the core layer, the pattern is then developed to remove the nonimage areas and leave behind the predetermined pattern. Any conventional development method can be used, for example, flushing with a solvent for the unirradiated composition. Such solvents include polar solvents, such as alcohols and ketones. The usual solvents are acetone, methanol, propanol, tetrahydrofuran and ethyl acetate, and for highly fluorinated monomers fluoroether solvents such as those sold by Ausimont under the tradename, Galden™, may be used.

The buffer and cladding layers need not be fully cured, but only partially polymerized. Partially polymerized means that some acrylate groups are present after polymerization, i.e., not all acrylates are converted to saturated hydrocarbons. This means that more than 0% of the number of acrylate groups, usually more than about 10%, and desirably more than about 25% of the acrylate groups remain unreacted. The usual upper limit on the number of unreacted groups depends on the gel point of the monomer(s), which in turn depends on the functionality (the number of acrylate groups per monomer). If the functionality equals an integer, f, then the desired upper limit for unreacted groups is sufficient to cause gelation and is approximately given by the relation $(1-1/f)*100\%$. As an illustration, the number of remaining unreacted groups for a tetra-acrylate monomer may be less than 75%, and the desired number of remaining unreacted groups for a diacrylate monomer is less than 50%. Partial polymerization of the layers prior to application of the next successive layer allows the layers to intermingle at their interface. This intermingling improves adhesion of the layers, and can in some cases be used to control the gradation of index of refraction at the interface.

Figure 6:
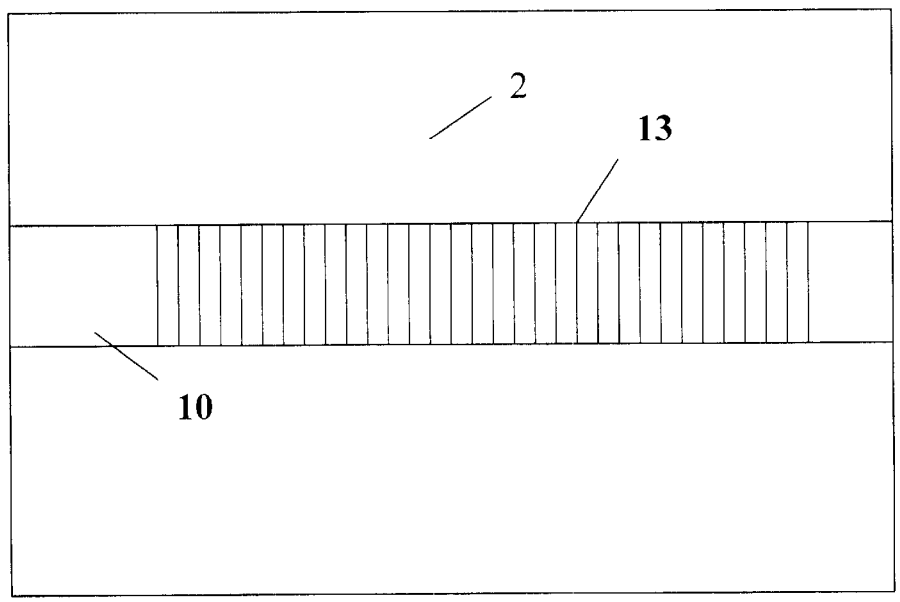
FIG. 6 is a plan view of a waveguide on a substrate in which the waveguide has been impressed with a grating.

After each layer has been applied and optionally patterned or impressed with a surface or volume diffraction grating or the like, any remaining unpolymerized acrylates are subjected to a hard curing by a blanket or overall exposure to actinic radiation such that they are substantially fully polymerized. A diffraction grating 13 is shown in FIG. 6. The cure dose (total radiant energy per unit square of surface) for the final cure step is typically from about 10 to about 500 times the dose employed to partially cure each layer during the preceding fabrication steps. Usually the final cure dose is about 100 times this intermediate dose. In this manner, the layers intermix at their interfaces during the early fabrication steps and can be mixed in any desired proportions to fine tune the refractive indices of the layers and the overall device and insure good adhesion between the layers by covalent bonding. Ultimately the desired structure is locked in with the final curing step, so that no further evolution of the structure may take place. In order to make planar polymeric optical waveguides, it is necessary to finely control the refractive index of various core and cladding layers. This can be achieved by tailoring the structure of the monomer used in a particular coating layer to achieve the desired refractive index. In practice, it is easier to blend several miscible monomers of different refractive indexes together to get the desired refractive index needed. When strongly reflecting gratings are required, it is desired to employ more than one monomer in the core and optionally in the cladding.

In addition to making planar waveguides using the lithographic method presented, it may also be possible to make planar waveguides by reactive ion etching, microreplication, direct laser writing or by laser ablation.

Flexibility of the materials allows for fabrication of devices with mechanical robustness. Cracking is also avoided even when the device is exposed to very high or very low temperatures. Good adhesion of the materials permits fabrication of robust devices on a variety of substrates without delamination even in some harsh environments such as high temperature and high humidity. Compatibility of device fabrication techniques with semiconductor industry practices allows for development of hybrid optoelectronic circuitry.

Waveguides of the present invention may have any of a number of convenient cross-sectional shapes, such as circular, polygonal, square, rectangular, trapezoidal, and rounded such as following a parabolic or Gaussian curve on the top and sides and flat at the bottom where they contact the substrate or buffer. An aspect of the invention that is of particular utility is its application to thermo-optic devices.

Figure 5:
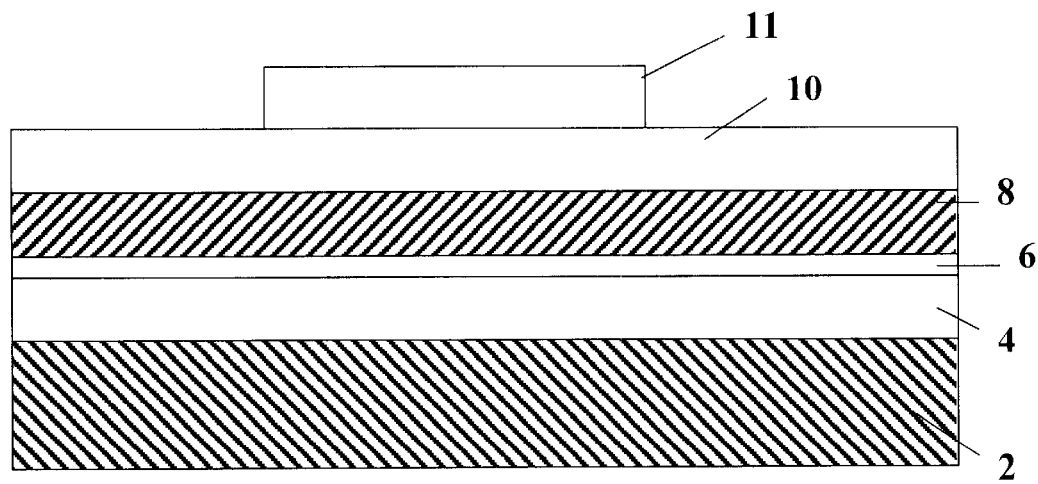
FIG. 5 is a cross sectional view of a waveguide having a heater attached to the overcladding.

These devices function by using the fact that index of refraction for most materials is a function of temperature. For polymers the change in index of refraction with respect to temperature (dn/dT) is negative and large with respect to most inorganic materials. Specific contemplated devices include optical switches and tunable filters based on gratings. It is common practice to use a heater on the top surface of the polymer stack, that is, on or above the uppercladding layer. The device is typically built on a substrate composed of a material that possesses a high thermal conductivity with respect to the polymer, for example, a silicon wafer. Applying power to the heater therefore establishes a thermal gradient wherein the polymer layer at the top is hotter than the polymer layers below. A heater 11, is shown in FIG. 5 attached to an overcladding 10. Because the value of dn/dT is negative, the index of refraction at the top of the polymer stack becomes less than the index at the bottom. This gradient in index tends to push the light propagating in any waveguide exposed to this gradient down toward the substrate. In devices such as switches and tunable gratings such a downward displacement of the light is undesirable. In the case of a switch the desired displacement is lateral, and in the case of the grating the desired displacement is none. The structure of the waveguide in the present invention acts to limit the motion of the light (mode) in the downward direction. This is accomplished by the fact that the low index buffer is brought into close proximity to the core of the waveguide. The influence of the buffer (provided $n_c-n_b>1.5*\Delta n$) will overcome the tendency for the mode to be pushed down toward the substrate. The improved waveguide geometry of the present invention leads to lower loss and less polarization dependence for devices such as switches and wavelength tunable gratings.

The following non-limiting examples serve to illustrate the invention.

EXAMPLE 1

A silicon wafer is cleaned and then silane treated to provide adhesion to acrylate formulations. The treated wafer is spin coated with a layer of buffer material made of the above described materials. The buffer layer is then partially cured by an overall exposure to actinic radiation while blanketed with nitrogen. Similarly, an undercladding layer is spin coated onto the buffer layer, with the buffer layer and undercladding layer being less than or equal to about 15 microns thick. The assembly is then further partially cured with UV light while blanketed with nitrogen. A core material made of the above-mentioned materials is then spin coated on top of the cladding layer. This material has been chosen such that it has a higher refractive index than the undercladding layer. The thickness of the core layer depends on the desired height of the waveguide, which typically ranges from 5 to 9 microns for single- mode guides. The core material is then exposed to UV light through a mask while blanketed with nitrogen. The core exposure dose is adjusted to achieve the desired width of the core and the desired degree of adhesion of the surrounding cladding. The unexposed material is then developed away with solvent. An overcladding layer, which may be the same material as used in the undercladding layer, is then coated on top of the core layer. This material is then cured by a final dose, which penetrates to all layers and completes the cure of the top layer as well as the underlying layers.

EXAMPLE 2

A mixture comprising 25 weight percent (wt %) of a fluorinated tetraacrylate F60TA, 75 wt % of a fluorinated diacrylate L-9367 are blended with 2 wt % of a fluorinated photoinitiator such as described in U.S. Patent 5,391,587 to form a homogeneous solution. The solution was then spin coated onto a silicon substrate and cured under a high-pressure mercury-xenon lamp at an irradiance of about 15 mW/cm² to form a 10 μm thick buffer. The buffer has a refractive index of 1.313. A mixture comprising 99 wt % of a fluorinated tetraacrylate F60TA and 1 wt % of a photoinitiator, Daracure® 1173, are blended to form a homogeneous solution. The solution was then coated onto the buffer and cured under a mercury lamp to form a 2 μm thick underclad having a refractive index of 1.329. A mixture comprising 92 wt % of a fluorinated tetraacrylate F60TA, 7 wt % of a fluorinated diacrylate C6DIACRY are blended with 1 wt % of photoinitiator, Daracure® 1173, to form a homogeneous solution. The solution was then coated onto a silicon substrate. It is exposed through a photomask to a mercury lamp and developed to form a 6 μm thick core having a refractive index of 1.336. Another layer of the cladding composition is applied over the core to form a 12-μm thick core overcladding having a refractive index of 1.329.

While the present invention has been particularly shown and described with reference to the embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A single-mode optical waveguide fabricated on a substrate, the substrate defining a surface, the single-mode optical waveguide comprising:

a polymeric buffer layer on the surface of the substrate, the buffer layer defining a surface and having an index of refraction $n_b$;

a thin, polymeric undercladding layer on the surface of the buffer layer, the undercladding layer defining a surface and having an index of refraction layer $n_u$;

a pattern of a light-transmissive single-mode polymeric core on the surface of the undercladding layer, the core defining a top surface and sidewalls and wherein the core has an index of refraction $n_c$; and a polymeric overcladding layer on the top surface of the core and on the sidewalls of the core and on a portion of the undercladding layer and having an index of refraction $n_o$; the undercladding layer having a thickness of from about 10 percent to about 50 percent of a thickness of the core;

wherein the core index of refraction $n_c$ is greater than the index of refraction of the overcladding layer $n_o$ and also greater than the index of refraction of the undercladding layer $n_u$; wherein $\Delta n = n_c - n_o$, and wherein the difference between $n_c$ and the index of refraction of the buffer $n_b$ is at least about 1.5 times $\Delta n$, and wherein the value of $\Delta n$ produces a single-mode waveguide at optical communication wavelengths.

2. The single-mode optical waveguide of claim 1 wherein the core has a cross-sectional width and a cross-sectional height, and wherein the core cross-sectional width and cross-sectional height together with the value of $\Delta n$ are selected such that the waveguide is single-mode for all optical communication wavelengths greater than about 1300 nm.

3. The single-mode optical waveguide of claim 1 wherein the difference between $n_c$ and $n_b$ is at least about 2 times $\Delta n$.

4. The single-mode optical waveguide of claim 1 wherein the difference between $n_c$ and $n_b$ is at least about 3 times $\Delta n$.

5. The single-mode optical waveguide of claim 1 wherein the thickness of the buffer layer is at least about 3 microns.

6. The single-mode optical waveguide of claim 1 wherein the thickness of the buffer layer plus undercladding layer is less than about 15 microns.

7. The single-mode optical waveguide of claim 1 wherein $\Delta n$ ranges from about 0.0031 to about 0.079.

8. The single-mode optical waveguide of claim 1 wherein the core has a cross-sectional width and a cross-sectional height which each range from about 2 $\mu$m to about 10 $\mu$m.

9. The single-mode optical waveguide of claim 1 wherein the core has a cross-sectional width and a cross-sectional height which each range from about 2 $\mu$m to about 10 $\mu$m; and wherein the cross-sectional width is no more than about twice the cross-sectional height, and the cross-sectional height is no more than about twice the cross-sectional width.

10. The single-mode optical waveguide of claim 1 wherein the core has a cross-sectional width and a cross-sectional height which each range from about 5.5 $\mu$m to about 8 $\mu$m.

11. The single-mode optical waveguide of claim 1 wherein the core has a cross-sectional width and a cross-sectional height and wherein the cross-sectional width and cross-sectional height are each selected from the group of dimensions consisting of about 2 $\mu$m, about 4 $\mu$m, about 5 $\mu$m, about 6 $\mu$m, about 7 $\mu$m, about 8 $\mu$m, and about 10 $\mu$m.

12. The single-mode optical waveguide of claim 1 wherein the core has a cross-sectional height and a cross-sectional width, and the core is single-mode in each of its cross-sectional width and cross-sectional height.

13. The single-mode optical waveguide of claim 1 further comprising a side interface region between the sidewalls of the core and the overcladding, side interface region having an index of refraction $n_s$.

14. The single-mode optical waveguide of claim 1 wherein the core defines a floor, the single-mode optical waveguide further comprising a floor interface region between the floor of the core and the undercladding layer, which floor interface region has an index of refraction $n_f$.

15. The single-mode optical waveguide of claim 1 wherein the core defines a floor, the single-moded optical waveguide further comprising
  a side interface region disposed between the sidewalls of the core and the overcladding layer, which side interface region has an index of refraction $n_s$ and
  a floor interface region disposed between the floor of the core and the undercladding layer which floor interface region has an index of refraction $n_f$.

16. The single-mode optical waveguide of claim 15 wherein $n_s$ is about equal to $n_f$.

17. The single-mode optical waveguide of claim 1 comprising:
  a side interface region between each of a pair of the sidewalls of the core and the overcladding layer having a graduated index of refraction $n_s$ which decreases from about $n_c$ at a portion of the side interface region closest to an adjacent one of the pair of sidewalls of the core to about $n_o$ at a portion of the side interface region closest to the overcladding layer.

18. The single-mode optical waveguide of claim 1 wherein the core defines a floor, the single-moded optical waveguide further comprising:
  a floor interface region between the floor of the core and the undercladding layer, the floor interface region having a graduated index of refraction $n_f$ which decreases from about $n_c$ at a portion of the floor interface region closest to the floor of the core to about $n_u$ at a portion of the floor interface region closest to the undercladding layer.

19. The single-mode optical waveguide of claim 1 wherein the core defines a floor, the single-moded optical waveguide further comprising:
  a side interface region between the pair of sidewalls of the core and the overcladding layer having a graduated index of refraction $n_s$ which decreases from about $n_c$ at a portion of the side interface region closest to an adjacent one of a pair of the sidewalls of the core to about $n_o$ at a portion of the side interface region closest to the overcladding layer; and
  a floor interface region disposed between the floor of the core and the undercladding layer having a graduated index of refraction $n_f$ which decreases from about $n_c$ at a portion of the floor interface region closest to the floor of the core to about $n_u$ at a portion of the floor interface region closest to the undercladding layer.

20. The single-mode optical waveguide of claim 19 wherein the graduated index of refraction $n_s$ about matches the graduated index of refraction $n_f$.

21. A micro-optoelectronic device which comprises:
  the single-mode waveguide of claim 1; and
  a heater disposed on the top surface of the overcladding layer.

22. A micro-optoelectronic device which comprises:
  the single-mode waveguide of claim 1; and
  a surface-relief or volume grating patterned into at least one of the polymeric buffer layer, the undercladding layer, the core, or the overcladding layer.

23. A method for forming a single-mode optical waveguide on a substrate, the substrate defining a surface, the method comprising the steps of:
  depositing a polymeric buffer layer onto the surface of the substrate, the buffer layer defining a surface and having an index of refraction $n_b$;
  depositing a polymeric undercladding layer onto the surface of the buffer layer, the undercladding layer defining a surface and having an index of refraction $n_u$;
  depositing a pattern of a light-transmissive, polymeric core onto the surface of the undercladding layer such that the undercladding layer has a thickness of from about 10 percent to about 50 percent of a thickness of the core, the core having a top surface and a pair of sidewalls and an index of refraction $n_c$; and
  depositing a polymeric overcladding layer onto the top surface core and onto the sidewalls of the core having an index of refraction $n_o$;
  wherein the core index of refraction $n_c$ is greater than the index of refraction of the overcladding layer $n_o$ and also greater than an index of refraction of the undercladding layer $n_u$; wherein $\Delta n = n_c - n_o$, and wherein the difference between $n_c$ and the index of refraction of buffer $n_b$ is at least about 1.5 times $\Delta n$, and wherein the value of $\Delta n$ produces a single-mode waveguide at optical communication wavelengths.

24. A method for forming a single-mode optical waveguide on a substrate, the substrate defining a surface, the method comprising the steps of:
  depositing a polymeric buffer layer onto a surface of a substrate, the buffer layer defining a surface and having an index of refraction $n_b$;
  depositing a polymeric undercladding layer onto the surface of the buffer layer, the undercladding layer defining a surface and having an index of refraction $n_u$;

depositing a photosensitive core layer onto the surface of the undercladding layer such that the undercladding layer has a thickness of from about 10 percent to about 50 percent of a thickness of the core, the photosensitive core layer having an index of refraction $n_c$;

imagewise exposing the photosensitive core layer to actinic radiation; and developing the core layer, thereby removing non-image areas of the core layer and not removing image areas of the core layer thus forming a patterned light-transmissive core on the undercladding layer and partially revealing a portion of the undercladding layer, which core has a top surface and a pair of side walls, and depositing a polymeric overcladding layer onto the top surface of the core, onto the pair of sidewalls of the core and onto the revealed portions of the undercladding layer;

wherein the core index of refraction $n_c$ is greater than the index of refraction of the overcladding layer $n_o$ and also greater than the index of refraction of the undercladding layer $n_u$; wherein $\Delta n = n_c - n_o$, and wherein the difference between $n_c$ and the index of refraction of buffer $n_b$ is at least about 1.5 times $\Delta n$, wherein the value of $\Delta n$ produces a single-mode waveguide at optical communication wavelengths.

* * * * *